(12) United States Patent
Srivastava

(10) Patent No.: US 12,345,818 B2
(45) Date of Patent: Jul. 1, 2025

(54) SYSTEM AND METHOD FOR DETERMINING GEOGRAPHIC LOCATION OF A DEVICE

(71) Applicant: Ankur Srivastava, New Delhi (IN)

(72) Inventor: Ankur Srivastava, New Delhi (IN)

( * ) Notice: Subject to any disclaimer, the term of this patent is extended or adjusted under 35 U.S.C. 154(b) by 445 days.

(21) Appl. No.: 17/978,182

(22) Filed: Oct. 31, 2022

(65) Prior Publication Data

US 2023/0139622 A1 May 4, 2023

(30) Foreign Application Priority Data

Nov. 1, 2021 (IN) .............................. 202111049994

(51) Int. Cl.
*G01S 11/04* (2006.01)
*G01S 11/06* (2006.01)
*G01S 17/48* (2006.01)

(52) U.S. Cl.
CPC ............... *G01S 17/48* (2013.01); *G01S 11/04* (2013.01); *G01S 11/06* (2013.01)

(58) Field of Classification Search
CPC ........... G01S 17/48; G01S 11/04; G01S 11/06
USPC ......................................................... 33/300
See application file for complete search history.

(56) References Cited

U.S. PATENT DOCUMENTS

| | | | |
|---|---|---|---|
| 10,165,415 B2 | 12/2018 | Kim et al. | |
| 10,514,261 B2 | 12/2019 | Sorenson et al. | |
| 11,659,354 B2 * | 5/2023 | Kassir | H04W 4/023 |
| | | | 455/456.2 |
| 11,812,340 B2 * | 11/2023 | Kumar | H04L 45/24 |
| 11,924,804 B2 * | 3/2024 | Yerramalli | H04W 4/029 |
| 12,192,812 B2 * | 1/2025 | Zhu | H04W 24/08 |
| 2005/0134453 A1 * | 6/2005 | Yamada | H04W 64/00 |
| | | | 455/456.1 |
| 2008/0036652 A1 | 2/2008 | Shore et al. | |
| 2010/0057359 A1 | 3/2010 | Caballero et al. | |

(Continued)

FOREIGN PATENT DOCUMENTS

EP 2504662 11/2018

OTHER PUBLICATIONS

Khomutov et al., "Noise in raw data from magnetic observatories," Geoscientific Instrumentation Methods and Data Systems, 6, 329-343, 2017, 15 pages.

(Continued)

*Primary Examiner* — George B Bennett
(74) *Attorney, Agent, or Firm* — Klarquist Sparkman, LLP

(57) ABSTRACT

The disclosure is directed to a system for determining a geographic location of device. The system includes at least one antenna and a controller. The at least one antenna is configured to detect magnetic field signals. The controller is configured to identify a first set of magnetic field signals including one or more magnetic field signals having a change in angle of arrival less than or equal to a predetermined angle of arrival threshold value or a change in the location of a source less than or equal to a predetermined location threshold value. The controller is further configured to identify a second set of magnetic field signals including one or more magnetic field signals having signal strength range within a predefined signal strength range. The controller is further configured to determine a geographic location of a device based on the identified second set of magnetic field signals.

20 Claims, 10 Drawing Sheets

(56) References Cited

U.S. PATENT DOCUMENTS

2017/0010334 A1    1/2017  Krause et al.
2022/0022056 A1*   1/2022  Park ..................... H04W 28/18
2022/0240322 A1*   7/2022  Duan ................... H04B 17/327

OTHER PUBLICATIONS

Zhou et al., "Geomagnetic sensor noise reduction for improving calibration compensation accuracy based on Improved HHT algorithm," IEEE, 2019, 1558-1748, 9 pages.

* cited by examiner

SYSTEM AND METHOD FOR DETERMINING GEOGRAPHIC LOCATION OF A DEVICE

FIELD

The present disclosure relates generally to a system and method for determining geographic location of a device and more particularly, relates to a system and method of determining the geographic location using geomagnetic field signals.

BACKGROUND

Today, the geographic location of a device carried by a user is used to provide variety of location-based services, such as, navigations, commute predictions, weather predictions, nearby restaurants, better local search results etc., to the user. One commonly used system that provides the geographic location of the device for navigation on the surface of the Earth is Global Positioning System (GPS). GPS is a satellite-based system that computes the geographic location of the device based on the signals received from the satellites arranged in the orbits of the Earth. However, obtaining the geographic location based on the GPS signals has various limitations. Firstly, the geographic location based on the GPS signals can only be obtained at locations where there is an unobstructed line of sight to four or more GPS satellites. The GPS signals get blocked due to obstacles, such as mountains and buildings, and thus obtaining the geographic location at such locations becomes challenging, which leads to weak GPS signals and inaccurate or unavailable location information. Secondly, the GPS works only on the surface of the Earth and does not work underground or underwater. Thirdly, various space, weather, and ionospheric conditions also affect the GPS signals obtained from the satellites, thereby impacting the accuracy of the location information.

SUMMARY

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the disclosure to the precise forms disclosed in the following detailed description. Rather, the embodiments are chosen and described so that others skilled in the art may appreciate and understand the principles and practices of the present inventive subject matter.

In one aspect, the disclosure is directed towards a system for determining a geographic location of device. The system includes at least one antenna and a controller coupled to the at least one antenna. The at least one antenna is configured to detect magnetic field signals comprising geomagnetic signal from the Earth and one or more magnetic field signals from one or more of static magnetic interference source and screaming magnetic interference source. The controller is configured to determine, for each magnetic field signal, at least one of a change in angle of arrival or a change in location of a source of the magnetic field signal within a predetermined time duration. The controller is further configured to identify a first set of magnetic field signals including one or more magnetic field signals having the determined change in the angle of arrival less than or equal to a predetermined angle of arrival threshold value or having the determined change in the location of the source is less than or equal to a predetermined location threshold value. The first set of magnetic field signals corresponds to the geomagnetic signal and the one or more magnetic field signals received from the static magnetic interference source. The controller is further configured to determine the signal strength for each of the one or more magnetic field signals in the first set of magnetic field signals and identify a second set of magnetic field signals including one or more magnetic field signals having the signal strength range within a predefined signal strength range. The predefined first signal strength range corresponds to the signal strength range of the geomagnetic signals from the Earth. The controller is further configured to determine a geographic location of a device based on the identified second set of magnetic field signals.

In another aspect, the disclosure is directed towards a method for determining a geographic location of a device. The method includes detecting, by at least one antenna, magnetic field signals comprising geomagnetic signal from the Earth and one or more magnetic field signals from one or more of static magnetic interference source and screaming magnetic interference source. The method further includes determining, by a controller, at least one of a change in angle of arrival or a change in location of a source of each magnetic field signal within a predetermined time duration and identifying, by the controller, a first set of magnetic field signals including one or more magnetic field signals having the determined change in the angle of arrival less than or equal to a predetermined angle of arrival threshold value or having the determined change in the location of the source less than or equal to a predetermined location threshold value. The first set of magnetic field signals correspond to the geomagnetic signal and the one or more magnetic field signals received from the static magnetic interference source. The method further includes determining, by the controller, the signal strength for each of the one or more magnetic field signals in the first set of magnetic field signals and identifying, by the controller, a second set of magnetic field signals including one or more magnetic field signals having the signal strength range within a predefined signal strength range. The predefined first signal strength range corresponds to the signal strength range of the geomagnetic signals from the Earth. The method further includes determining, by the controller, a geographic location of a device based on the identified second set of magnetic field signals.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

Figure 1:
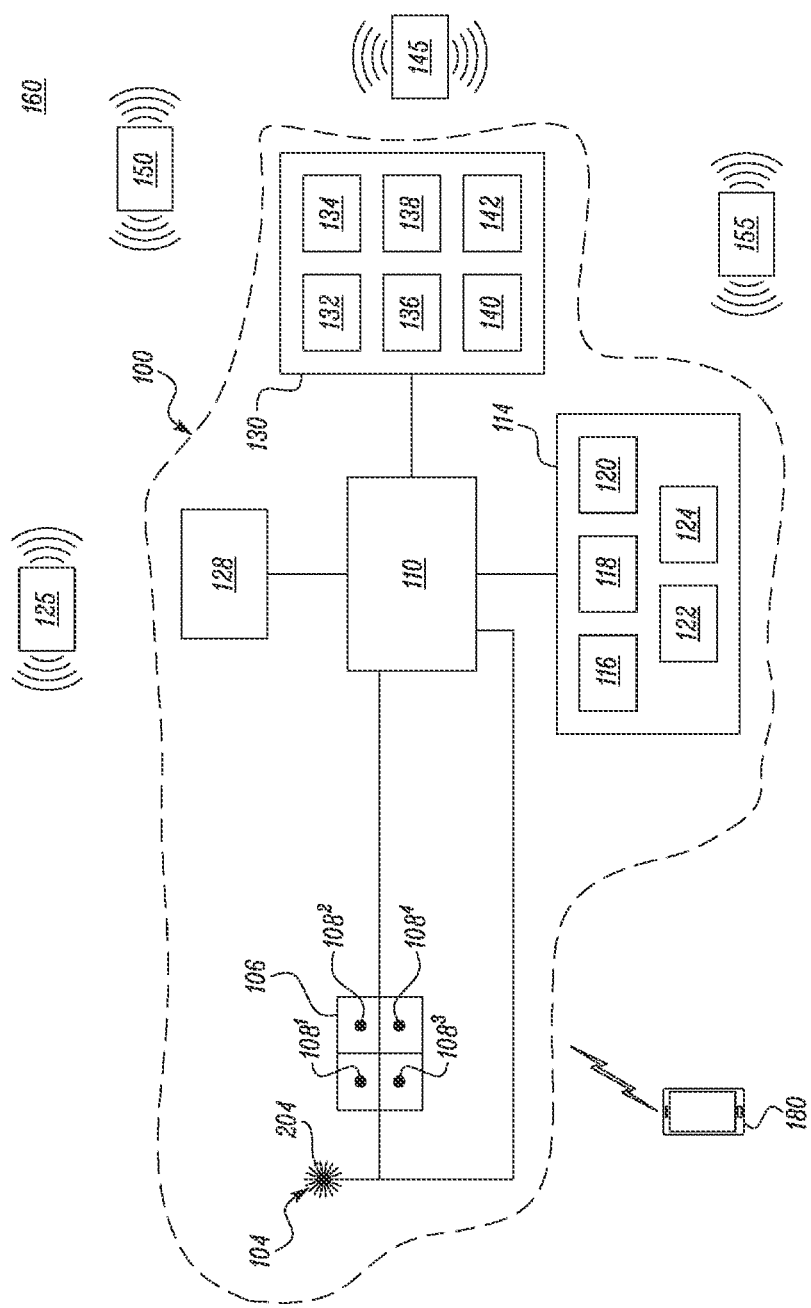
FIG. 1 illustrates a system employed at a site for determining a location of a device, in accordance with the embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Hereinafter, the exemplary embodiments of the present disclosure will be described in conjunction with the accompanying drawings, and it may be understood that the exemplary embodiments described herein are only used to illustrate and explain the present disclosure and are not intended to limit the present disclosure. While several examples are described in the description, modifications, adaptations, and other implementations are possible. Accordingly, the following detailed description is not limited by the disclosed examples.

References to "some embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in some embodiment" does not necessarily refer to the same embodiment.

In general, the Earth is a giant magnet which generates a magnetic field (also known as geomagnetic field) measurable at any point on and near the surface of the Earth. In most cases, the detected geomagnetic field can be used to determine the geographic location of any device. To obtain accurate geographic location of any device based on the geomagnetic field, it is required that clean geomagnetic field readings that are free from any interference and noise are utilized. However, obtaining the clean geomagnetic field readings is a challenging task, as the detected magnetic field may contain a contribution from a local magnetic interference field created by magnetic sources present in the surroundings. Furthermore, there are deviations, dips, and breaks occurring in the Earth's geomagnetic field at different points and locations due to regional anomalies, pole reversal, etc., which may also need to be considered to accurately determine the geographic location of the device. Many other factors such as, but not limited to, earthquakes, solar storms, ionization of electrons in the atmosphere etc., also affect the Earth's geomagnetic field.

To this end, in an aspect of the present disclosure, a system for determining geographic location (interchangeably referred to as position information or location information) of a device using the geomagnetic field of the Earth is described. The present disclosure is directed towards obtaining noise-free geomagnetic field readings (hereinafter interchangeably referred to as clean geomagnetic field readings) and determining the geographic location of the device based on the obtained clean geomagnetic field readings. FIG. 1 illustrates an exemplary system 100 employed at a site 160 for determining the geographic location of a device 180 present in the site 160 based on the geomagnetic field, in accordance with the various embodiments of the present disclosure. The device 180 may be any type of electronic device such as, but not limited to, any external device that can be connected via a hardware port or integrated within a smart phone, a laptop computer, a Personal Digital Assistant (PDA), a navigation device, a wearable device, a tablet, tactical device, mountable, stationary or any other in-motion device, and the system 100 may be coupled to or integrated within the device 180 to determine the position information of the device 180. In any implementation, the device 180 is positionally located in proximity or at a same position as that of the system 100. In some embodiments, the system 100 may function as a stand-alone device configured to determine its own geographic location.

In addition to the system 100 and the device 180, the site 160 may include a plurality of static magnetic interference sources 125, 145 and a plurality of screaming magnetic interference sources 150, 155. In accordance with the embodiments of the present disclosure, the plurality of static magnetic interference sources 125, 145 and the plurality of screaming magnetic interference sources 150, 155 generate magnetic fields in the immediate surroundings of the system 100 that may interfere with the Earth's geomagnetic field. The plurality of static magnetic interference sources 125, 145 may be defined as sources of interference that generate constant magnetic field that interfere with the Earth's geomagnetic field and vary slightly over the different temporal and closely spaced spatial frames. For example, the static magnetic interference sources 125, 145 may include rail or subway systems, electrical grids, magnetic diagnosis labs or other sources that may emit a constant magnetic radiation and vary slightly over temporal frames. The plurality of screaming magnetic interference sources 150, 155 may include any temporary magnetic field sources that generate magnetic field signals changing substantially over different temporal frames that may be close to each other or at a distance and interfering with the geomagnetic signals obtained from the Earth. In an exemplary embodiment, the screaming magnetic interference sources 150, 155 may include portable electronic devices, hard disks, tablets, devices with inbuilt magnets etc. The plurality of static magnetic interference sources 125, 145 and the plurality of screaming magnetic interference sources 150, 155 may be known or unknown to a user of the system 100 or the device 180.

As illustrated in FIG. 1, the system 100 includes at least one antenna 104, at least one micro-grid 106 including a plurality of magnetic field sensors $108^1$, $108^2$, $108^3$, $108^4$, a controller 110, an observation unit 114, an input/output (I/O) unit 128, and a master database 130 coupled to each other via wired or wireless connections.

Figure 2:
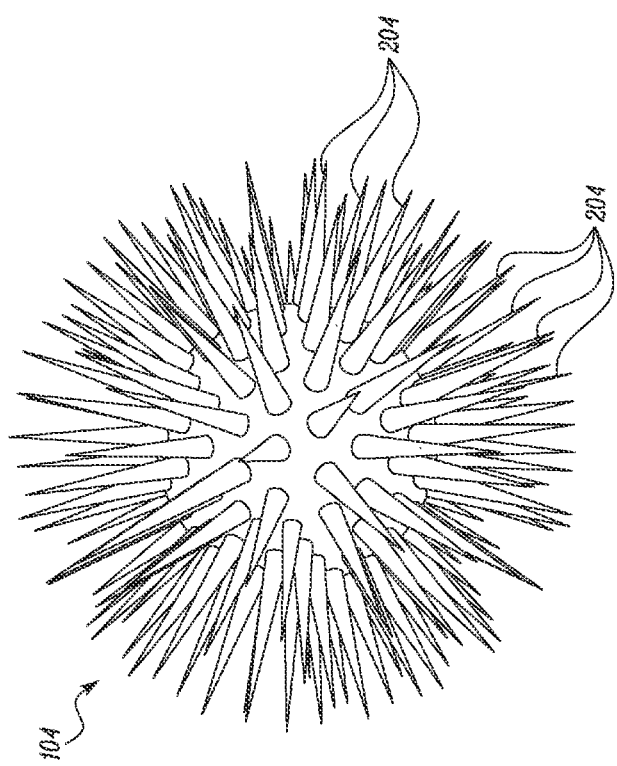
FIG. 2 illustrates an exemplary antenna employed within the system of FIG. 1, in accordance with the embodiments of the present disclosure.

The antenna 104 employed in the system 100 may be a Multiple-Input Multiple-Output (MIMO) antenna comprising a plurality of magnetic field sensor probes 204 (as shown in FIG. 2). The antenna 104 may be used singularly or in a linear or matrix formation. Each magnetic field sensor probe 204 may include an in-built antenna element and a magnetic field sensor coupled to the in-built antenna element. In accordance with the embodiments of the present disclosure, each magnetic field sensor probe 204 is positioned at a different angle on the antenna 104 with respect to the remaining plurality of magnetic field sensor probes 204 on the antenna 104. In some embodiments, as shown in FIG. 2, the plurality of magnetic field sensor probes 204 on the antenna 104 are arranged in all directions in a circular configuration to form a three-dimensional circle. Each of the plurality of magnetic field sensor probes 204 may be tightly packed on the antenna 104. For example, each of the plurality of magnetic field sensor probes 204 may be arranged at an angle of 1 degree or less on the antenna 104 with respect to the other magnetic field sensor probes 204 on the antenna 104 to tightly pack the plurality of the magnetic field sensor probes 204 on the antenna 104.

In accordance with various embodiments of the present disclosure, each magnetic field sensor probe 204 is provided with an ability to detect Angle of Arrival (AoA) of incoming signals. The detection of the AoA calculation may be performed by measuring Time Difference of Arrival (TDOA) between each magnetic field sensor probe of the antenna 104, using various techniques known in the art. This may also be visualized as a reverse beam forming process where TDOA is measured at received phase at each magnetic field sensor probe 204 in the antenna 104.

In accordance with the embodiments of the present disclosure, each magnetic field sensor probe 204 is configured to detect the magnetic field in the immediate surroundings of the system 100. To this end, each magnetic field sensor probe 204 may be configured to receive various signals corresponding to the magnetic field (hereinafter referred to as magnetic field signals) in the immediate surroundings of the system 100. For example, the magnetic field signals that are received by the magnetic field sensor probes 204 may include magnetic field signals from the Earth (i.e., geomagnetic signal) along with the magnetic field signals from the plurality of static magnetic interference sources 125, 145 and the plurality of screaming magnetic interference sources 150, 155. Each magnetic field sensor probe 204 is further configured to provide the received magnetic field signals to the controller 110.

In accordance with some embodiments, each magnetic field sensor probe 204 may also be configured to determine the angle of arrival (AoA), a magnitude, and a phase of each magnetic field signal received by the respective magnetic field sensor probe 204 and provide the determined AoA, magnitude, and phase along with the associated magnetic field signal to the controller 110. A person skilled in the art would appreciate that the determination of AoA, magnitude, and a phase of a signal using an antenna probe is well known in the art, the details of which are not provided here for the sake of brevity of the disclosure.

The system 100 may further include the controller 110 operatively coupled to the antenna 104. The controller 110 may include one or more microprocessors, microcontrollers, Digital Signal Processors (DSPs), state machines, logic circuitry, or any other device or devices that process information and/or signals based on operational or programming instructions. The controller 110 may be implemented using one or more controller technologies, such as Application Specific Integrated Circuit (ASIC), Reduced Instruction Set Computing (RISC) technology, Complex Instruction Set Computing (CISC) technology, etc. The controller 110 may be configured to execute the instructions stored in a memory (not shown) to perform the predetermined operations.

The controller 110 is configured to receive the magnetic field signals along with the AoA, the magnitude, and the phase associated with each magnetic field signal from one or more magnetic field sensor probes 204 and process the magnetic field signals to obtain clean geomagnetic readings. In accordance with various embodiments of the present invention, the controller 110 may be configured to receive and process the magnetic field signals received by the plurality of the magnetic field sensor probes 204 to obtain the clean geomagnetic readings. While in some embodiments, the controller 110 may be configured to identify a magnetic field sensor probe (hereinafter referred to as a primary magnetic field sensor probe) from the plurality of magnetic field sensor probes 204 on the antenna 104 and process the magnetic field signals received by the primary magnetic field sensor probe to obtain the clean geomagnetic readings.

Figure 3:
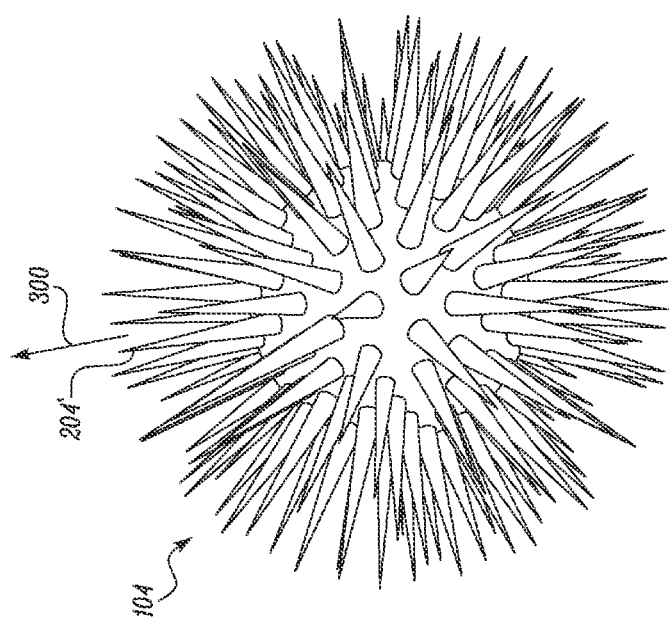
FIG. 3 illustrates a primary magnetic field sensor probe of the exemplary antenna employed within the system, in accordance with the embodiments of the present disclosure.

Identification of Primary Magnetic Field Sensor Probe:

In accordance with various embodiments of the present disclosure, the controller 110 may be configured to identify the primary magnetic field sensor probe for which the associated magnetic field signals are to be processed. When the system 100 is in motion, the primary magnetic field sensor probe 204' may be identified as the magnetic field sensor probe that is aligned with the direction 300 of the movement of the system 100 or the device 180, as shown in FIG. 3. To this end, the controller 110 may be further configured to determine the acceleration values ($A_{x,i,t}$, $A_{y,i,t}$, $A_{z,i,t}$) in all three dimensions across all magnetic field sensor probes 204 on the antenna 104, where A represents the acceleration vector, i represents the magnetic field sensor probe 204, and t represents the time in nano seconds and x, y and z are the three axes of possible motion. The magnetic field sensor probes 204 on the antenna 104 may be coupled to one or more accelerometer 118 (shown as a part of the observation unit 114) to determine the acceleration values for each magnetic field sensor probe 204. In such cases, the controller 110 may be configured to receive the acceleration values from the one or more accelerometers 118. In some embodiments, the controller 110 may be configured to generate a matrix $A_i$ based on the determined acceleration values from the plurality of magnetic field sensor probes 204 at various time intervals. For example, the matrix $A_i$ may be represented as:

$$A_i = \int^i A_{x,y,z}(t)$$

-continued $i = 0$

The controller 110 may be further configured to analyze the acceleration values in the matrix $A_i$ to identify the magnetic field sensor probe 204 with the highest value of acceleration from the matrix $A_i$. The highest value of the acceleration may be across any one of the axis $A_{x,i,t}$, $A_{y,i,t}$, $A_{z,i,t}$. The magnetic field sensor probe 204 corresponding to identified highest value of acceleration across all available readings any one of the axis (x, y and z) is then identified as the primary magnetic field sensor probe 204'.

Further, when the system 100 is stationary, the primary magnetic field sensor probe may be the magnetic field sensor probe 204 that is aligned with the angular placement of the plane of the system 100. To this end, the controller 110 may be configured to determine the angular placement (X, Y, Z axis or the tilt) of each magnetic field sensor probe 204. The magnetic field sensor probes 204 on the antenna 104 may be coupled to one or more gyroscopes 120 (shown as a part of the observation unit 114) to determine the angular placement for each magnetic field sensor probe 204. In such cases, the controller 110 may be configured to receive the angular placement values from the one or more gyroscopes 120. The controller 110 is further configured to determine the angular placement of the plane of the system 100 using the one or more gyroscopes 120 or other techniques known in the art. The controller 110 may be further configured to identify the magnetic field sensor probe that is aligned with the angular placement of the plane of the system 100 as the primary magnetic field sensor probe.

The forthcoming disclosure describes processing of the magnetic field signals associated with the primary magnetic field sensor probe, however, it may be contemplated that the same processing technique is applied to process the magnetic field signals associated with the other magnetic field sensor probes when the system 100 is employed to determine the geographic location of the device 180 based on the magnetic field signals from the plurality of magnetic field sensor probes 204.

Classification of Screaming and Static Magnetic Interference Sources

In an exemplary embodiment, the controller 110 may be configured to determine, for each magnetic field signal, at least one of a change in angle of arrival or a change in location of the magnetic field signal within a predetermined time duration. The controller 110 is further configured to identify a first set of magnetic field signals including one or more magnetic field signals having the determined change in the angle of arrival less than or equal to a predetermined angle of arrival threshold value or having the determined change in the location less than or equal to a predetermined location threshold value. In accordance with various embodiments of the present disclosure, the identified first set of magnetic field signals corresponds to the geomagnetic signal including the one or more magnetic field signals received from the static magnetic interference sources 125, 145.

To this end, the controller 110 may be configured to receive the magnetic field signals associated with the primary magnetic field sensor probe (described in the 'Identification of Primary Magnetic Field Sensor Probe' section) along with the AoA, the magnitude, and the phase of each magnetic field signal. The controller 110 may be further configured to determine voltage level, such as based on the signal strength by undertaking summation of absolute squares of its time-domain sample divided by signal length or the square of its Root Mean Square (RMS) level, for each magnetic field signal based on the received magnitude and phase of the magnetic field signal, using various techniques known in the art.

The controller 110 may be configured to determine location of the source of each magnetic field signal based on the AoA and voltage level associated with the magnetic field signal, such as via distance derivation via Free Space Path Loss (FSPL) and/or other location determination algorithms known in the art. In some embodiments, the controller 110 may be configured to utilize the AoAs and the voltage levels corresponding to each magnetic field signal from at least one other magnetic field sensor probe 204 to determine the exact location of the source, for example, using the triangulation technique. For such cases, the distance between the magnetic field sensor probes 204 and an offset defined as Probe Placement Offset (PPO) between the angles of the two or more magnetic field sensor probes 204 on the antenna 104 may also be factored in to determine the accurate location of the source. In accordance with various embodiments of the present disclosure, the controller 110 may be configured to determine the location of each source at several time intervals to determine the change in the location of the source. A person skilled in the art would appreciate that there are various methods to determine the location and the change in the location of the source based on the AoA and voltage of the signals received from the source, which are not described here for the sake of brevity of the disclosure.

In some embodiments, the controller 110 may also be configured to determine the distance traveled by the system 100 between the several different time instances. To this end, the controller 110 may be configured to obtain the values related to the initial velocity and the acceleration of the system 100 at the several different time instances using the one or more accelerometers 118. The controller 110 may be further configured to determine, for each time instance, the speed of the system 100 based on the initial velocity and the acceleration of the system 100. The controller 110 may be configured to determine the distance travelled by the system 100 between the several different time instances based on the speed of the system 100. In some embodiments, the controller 110 may also be configured to determine the change in elevation and tilt of the system 100 between the several different time instances. To this end, the system 100 may be configured to utilize the one or more gyroscopes 120 (shown as a part of the observation unit 114) to determine the tilt of the system 100. Further, the system 100 may include an altimeter 122 (shown as a part of the observation unit 114) coupled to the controller 110 and the controller 110 may be configured to obtain the elevation data associated with the system 100 at the several different time instances based on the readings from the altimeter 122. In such embodiments, the controller 110 may be configured to determine the change in the location of the source of each magnetic field signal between the several different time instances based on the change in the distance traveled by the system 100 and the change in the elevation of the system 100.

The controller 110 may be configured to classify whether the source of the magnetic field signal is a screaming source (such as, the screaming magnetic interference sources 150, 155) or not. In accordance with various embodiments of the present disclosure, the source classification is done based on the change in the location of the source, the AoA of the magnetic field signal from the source, and the voltage level of the magnetic field signal from the source. Analysis of location and voltage data from the defined sources are analysed between time intervals (or temporal frames) and with applicable PPO to check if the source position does not change while presenting a variation in the magnetic strength over the traversed distance. In an exemplary embodiment, the controller 110 may be configured to classify a source as a screaming source when the determined change in the location of the source is greater the predetermined location threshold value. In other words, the controller 110 may be configured to classify the source as the Earth or one of the static magnetic interference sources 125, 145 when the determined change in the location of the source is less than or equal to the predetermined location threshold value. In general, the magnetic strength of the magnetic field signals from the Earth are constant over temporal frames whereas the magnetic field signals from the screaming magnetic interference sources 150, 155 present variation in the magnetic strength.

In some embodiments, the controller 110 may be configured to obtain the voltage levels and AoA of each magnetic field signal over a period of time. The controller 110 may be further configured to determine a change in the AoA of the magnetic field signal within a predetermined time duration. The controller 110 may be configured to classify a source as a screaming source when the determined change in the AoA and voltage of the magnetic field signal from the source is greater the predetermined angle of arrival and voltage threshold value. The predetermined threshold value may be determined based on the positioning of the magnetic field sensor probes 204 within the antenna 104. In an exemplary embodiment, when the magnetic field sensor probes 204 are closely packed in the antenna 104, the predetermined threshold value may be kept at minimum or close to zero. In an alternate embodiment, when the magnetic field sensor probes 204 are spatially apart in the antenna 104, the predetermined threshold value may have a higher value depending on the distance between the magnetic field sensor probes 204 within the antenna 104. In other words, the controller 110 may be configured to classify the source as the Earth or one of the static magnetic interference sources 125, 145 when the determined change in the AoA of the magnetic field signal from the source is less than or equal to the predetermined angle of arrival and voltage threshold value across temporal frames. In an exemplary embodiment, the controller 110 may be configured to discard the magnetic field signals with changing angle of arrival during the predetermined time duration as such signals may correspond to the screaming magnetic interference sources 150, 155 (mostly noise and clearly not the geomagnetic signals from the Earth) in the surrounding of the system 100. In other words, the AoA of the magnetic field signals from the Earth stay constant over time whereas the AoA and voltage levels of the magnetic field signals from the screaming magnetic interference sources 150, 155 keeps changing over the time and hence the magnetic field signals with changing AoA can be classified as noise.

In another exemplary embodiment, the controller 110 may be configured to classify a source as a screaming source (such as the screaming magnetic interference sources 150, 155) when between the several different temporal instances, one or both of the AoA and the voltage level of the magnetic field signal received from the source is different and when there is no change in the location of the source. Similarly, the controller 110 may be configured to classify a source as the Earth or the static magnetic interference sources 125, 145 when, between the several different time instances, AoA (post application of PPO) and the voltage level of the magnetic field signal received from the source is same and when there is no change in the location of the source.

The controller 110 may be further configured to identify the first set of magnetic field signals that excludes the magnetic field signals received from the identified screaming magnetic interference sources 150, 155. In other words, the controller 110 may be configured to identify the first set of magnetic field signals that includes one or more magnetic field signals from the Earth or the static magnetic interference sources 125, 145.

Determination of Signal Strength/Total Intensity of Magnetic Field Signals

Figure 10:
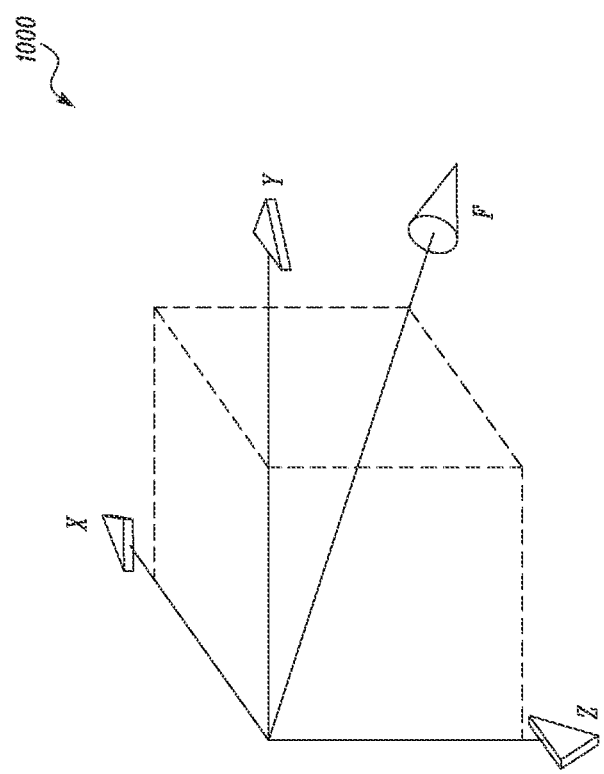
FIG. 10 illustrates a Cartesian coordinate system for describing the Earth's geomagnetic field.

In general, at any location, the magnetic field detected by the magnetic field sensor probe 204 can be represented by a three-dimensional vector. In a Cartesian coordinate system 1000 for describing the Earth's geomagnetic field as shown in FIG. 10, the three-dimensional vector is represented by three components corresponding to the projections of the vector on three mutually orthogonal axis that are labelled as X (northerly intensity), Y (easterly intensity), and Z (vertical intensity, positive downwards). The total intensity of the magnetic field is referred to as F.

The controller 110 may be configured to analyze the magnetic field signals in the first set and determine X (northerly) intensity, Y (easterly) intensity, and Z (vertical) intensity corresponding to each of the magnetic field signal in the first set, such as by using known techniques. The controller 110 may be further configured to determine F (total intensity or signal strength) of each magnetic field signal in the first set based on the determined X (northerly intensity), Y (easterly intensity), Z (vertical intensity) values using the following equations:

$$F=\sqrt{X^2+Y^2+Z^2}$$

In accordance with various embodiments, the determined X (northerly) intensity, Y (easterly) intensity, and Z (vertical) intensity are assumed to be calibrated to compensate for any placement error. In some embodiments of the present disclosure, the controller 110 may be configured to determine a placement error between the one or more accelerometers 118 and each magnetic field sensor probe 204 in the system 100 and determine a delta value that is to be applied to determined X (northerly intensity), Y (easterly intensity), Z (vertical intensity) to compensate for the determined placement error, using various techniques known in the art or future developed. In an exemplary embodiment, the one or more gyroscopes 120 provided in the system 100 may be utilized for determining the placement error between the one or more accelerometers 118 and each magnetic field sensor probe 204 in the system 100.

In some embodiments, the controller 110 may be configured to further calibrate the value of F (total intensity or signal strength) corresponding to each magnetic field signal in the first set, to compensate for the space, weather, and ionospheric conditions of the immediate surroundings of the system 100. To this end, the system 100 includes a master database 130 configured to store data related to environmental conditions that may impact the magnetic field signals received by the at least one antenna 104. The master database 130 includes a first database 132 configured to store data related to predicted solar activities, such as but not limited to, solar storms, corresponding to the various X (northerly) intensity, Y (easterly) intensity, and Z (vertical) intensity values and a corresponding first delta value to be applied to the total intensity or signal strength. The data related to the predicted solar activities may comprise a date, a time, a predicted duration, and a predicted strength of the solar storms corresponding to the various X (northerly) intensity, Y (easterly) intensity, and Z (vertical) intensity values. The master database 130 may further include a second database 134 configured to store predicted data related to change in the geomagnetic activity of the Earth corresponding to the various X (northerly) intensity, Y (easterly) intensity, and Z (vertical) intensity values and a corresponding second delta value to be applied to the total intensity or signal strength. The data related to change in the geomagnetic activity of the Earth may include a date, a time, a predicted rate of shifting of the Earths pole corresponding to the various X (northerly) intensity, Y (easterly) intensity, and Z (vertical) intensity values. The master database 130 may further include a third database 136 configured to store predicted data related to change in the ionization of electrons in the ionosphere corresponding to the various X (northerly) intensity, Y (easterly) intensity, and Z (vertical) intensity values at different times of the day and a corresponding third delta value to be applied to the total intensity or signal strength. The predicted data includes the date, the time of day, and a predicted change in the ionization of electrons in the ionosphere corresponding to the various X (northerly) intensity, Y (easterly) intensity, Z (vertical) intensity values.

The master database 130 may further include a fourth database 138 configured to store data associated with the total intensity or signal strength of the magnetic field signals during a quiet day corresponding to the various X (northerly intensity), Y (easterly intensity), Z (vertical intensity) values. In accordance with the embodiments of the present disclosure, the quiet day corresponds to any day when the environmental conditions are stable and there is no Earthquake, solar storms, or any other activity that might possibly impact the magnetic field signals obtained from the Earth. The master database 130 may further include a fifth database 140 configured to store data associated with the total intensity or signal strength of the magnetic field signals previously detected by the system 100 along with a time stamp at which the total intensity or signal strength of the magnetic field signals were taken. The master database 130 may further include a sixth database 142 including data related to geographical anomalies (such as, crust, elevation, metal concentration etc.) corresponding to the various X (northerly intensity), Y (easterly intensity), Z (vertical intensity) values and a corresponding fourth delta value to be applied to the total intensity or signal strength.

The system 100 includes the observation unit 114 further including an Earthquake sensor 116 and a digital compass 124. The observation unit 114 is configured to measure data associated with the surroundings of the system 100 and provide the measured data to the controller 110. For example, the Earthquake sensor 116 may be configured to sense the vibrations from the Earth and provide the data related to the sensed vibrations, such as, richter scale reading, to the controller 110. The digital compass 124 may be configured to determine the magnetic north pole and the direction of the system 100 in relation to the X, Y, and Z components of the Earth's magnetic field and provide it to the controller 110.

In some embodiments, the controller 110 may be further configured to calibrate the value of F (total intensity or signal strength) corresponding the magnetic field signals in the first set based on the data stored in the master database 130. To this end, the controller 110 may be further configured to receive data related to the first delta value (positive or negative) from the first database 132 to be applied to the value of F (total intensity or signal strength) corresponding to the determined X (northerly intensity), Y (easterly intensity), Z (vertical intensity) values. In general, the solar activities, such as solar storms, may affect the total intensity or signal strength of the magnetic field signals at a particular location. Thus, the first delta value may represent an adjustment that needs to be applied to the total intensity or signal strength of the magnetic field signals corresponding to the determined X (northerly intensity), Y (easterly intensity), Z (vertical intensity) values to compensate the change in the magnetic field signals due to the solar activity.

In some embodiments, the controller 110 may be further configured to receive the second delta value (positive or negative) from the second database 134 to be applied to the total intensity or signal strength of the magnetic field signals corresponding to the determined X (northerly intensity), Y (easterly intensity), Z (vertical intensity) values. In general, the continuous change in the geomagnetic activity of the Earth affects the magnetic field signals at a particular location. Therefore, the second delta value may represent an adjustment that needs to be applied to the total intensity or signal strength of the magnetic field signals to compensate for the change in the geomagnetic activity of the Earth.

The controller 110 may be further configured to receive the third delta value (positive or negative) from the third database 136 to be applied to the total intensity or signal strength of the magnetic field signals corresponding to the determined X (northerly intensity), Y (easterly intensity), Z (vertical intensity) values. In general, the continuous change in the ionization of electrons in the ionosphere affects the magnetic field signals. Thus, the third delta adjustment value may represent an adjustment that needs to be applied to the total intensity or signal strength of the magnetic field signals to compensate for the change in the ionization of electrons in the ionosphere.

In some embodiments, the controller 110 may be configured to receive the fourth delta value (positive or negative) from the sixth database 142 to be applied to the total intensity or the signal strength of the magnetic field signals corresponding to the determined X (northerly intensity), Y (easterly intensity), Z (vertical intensity) values. In general, the geographical anomalies, such as unusual elevations or dips, affects the magnetic field signals. Therefore, the fourth delta value may represent an adjustment that needs to be applied to the total intensity or the signal strength of the magnetic field signals to compensate for the geographical anomalies.

In some embodiments, the controller 110 may be configured to receive the data related to the sensed vibrations from the Earthquake sensor 116 and determine if the vibrations sensed by the Earthquake sensor 116 are greater than a first threshold value. In such cases, when the controller 110 determines that the vibrations sensed by the Earthquake sensor 116 are greater than the first threshold value, the controller 110 determines the time frame during which the vibrations sensed by the Earthquake sensor 116 were greater than the first threshold value and discard the magnetic field signals or magnetic field reading associated with the magnetic field signals from the first set that fall within the determined time frame. In some embodiments, the magnetic field signals or the magnetic field readings obtained during the determined time frame may be replaced with the magnetic field signals or the magnetic field readings detected outside the determined time frame.

In some embodiments, the system 100 further comprises the input/output (I/O) unit 128 that may include a graphical user interface or other input/output means (such as, over the air port, USB port, Serial port etc.) to receive various configuration files including data to be stored in the master database 130. In some embodiments, the I/O unit 128 may be configured to display the clean geomagnetic readings and the geographic location of the device 180 determined by the controller 110.

Range Filter: Removal of Signals from Static Magnetic Interference Sources

The controller 110 is further configured to determine whether a range of the total intensity (hereinafter interchangeably referred to as signal strength) of each magnetic field signal falls within the predefined signal strength range or not. When the magnetic field signal is determined to be within the predefined signal strength range, the magnetic field signal is included in the second set of magnetic field signals. Alternatively, when the magnetic field signal is determined not to be within the predefined signal strength range, the magnetic field signal is dropped and is not included in the second set of magnetic field signals. In accordance with various embodiments of the present disclosure, the predefined first signal strength range corresponds to the signal strength range of the geomagnetic signals from the Earth.

To this end, the system 100 further comprises the micro-grid 106 having four (4) magnetic field sensors $108^1$, $108^2$, $108^3$, and $108^4$ coupled to each other. Although only four (4) magnetic field sensors are shown in FIG. 1, a person skilled in the art would appreciate that the micro-grid 106 may comprise any number of magnetic field sensors to perform the following functions, without limiting the scope of the present disclosure. In accordance with the embodiments of the present disclosure, each of the magnetic field sensors $108^1$, $108^2$, $108^3$, and $108^4$ may operate in different signal strength ranges and may be configured to obtain the magnetic field signals in the first set.

In accordance with various embodiments of the present disclosure, the signal strength range of each magnetic field sensor $108^1$, $108^2$, $108^3$, and $108^4$ may be defined based on the number of the magnetic field sensors $108^1$, $108^2$, $108^3$, and $108^4$ in the micro-grid $106^1$. For example, the signal strength range of each magnetic field sensor $108^1$, $108^2$, $108^3$, and $108^4$ may be defined such that signal strength range covered by the combination of the magnetic field sensors $108^1$, $108^2$, $108^3$, and $108^4$ falls between a predefined range, for example, between 0.10 Gauss to 1.5 Gauss. To this end, in an embodiment, the signal strength range of 0.10 Gauss to 1.5 Gauss may be divided by the number of magnetic field sensors $108^1$, $108^2$, $108^3$, and $108^4$ in the micro-grid $106^1$ to equally split the signal strength range of 0.10 Gauss to 1.5 Gauss among the magnetic field sensors $108^1$, $108^2$, $108^3$, and $108^4$ in the micro-grid $106^1$. In some embodiments, the signal strength range of 0.10 Gauss to 1.5 Gauss is split among the magnetic field sensors $108^1$, $108^2$, $108^3$, and $108^4$ in such a way that the signal strength range defined for a magnetic field sensor $108^1$, $108^2$, $108^3$, and $108^4$ partially overlaps with the signal strength range defined for other sensors $108^1$, $108^2$, $108^3$, and $108^4$. A person with ordinary skill in the art would understand that various other known or future developed methods for splitting the signal strength range of 0.10 Gauss to 1.5 Gauss between the magnetic field sensors $108^1$, $108^2$, $108^3$, and $108^4$ may be employed to perform the following functions, without limiting the scope of the present disclosure.

For instance, the first magnetic field sensor $108^1$ may be configured to operate in a first signal strength range having a first minimum signal strength value and a first maximum signal strength value. In an exemplary embodiment, the first signal strength range may be 0.10 Gauss to 0.80 Gauss, wherein the first minimum value is 0.10 Gauss and the first maximum value is 0.80 Gauss. In such cases, the first magnetic field sensor $108^1$ may be configured to identify the magnetic field signals having the signal strength in the range of 0.10 Gauss-0.80 Gauss from the first set. Further, the second magnetic field sensor $108^2$ may be configured to operate in a second signal strength range having a second minimum signal strength value and a second maximum signal strength value, wherein the second minimum signal strength value is less than the first minimum signal strength value and the second maximum signal strength value is less than the first maximum signal strength value. In an exemplary embodiment, the second signal strength range is 0.01 Gauss-0.40 Gauss, wherein the second minimum value is 0.01 Gauss and the second maximum value is 0.40 Gauss. In such cases, the second magnetic field sensor $108^2$ may be configured to identify the magnetic field signals having the signal strength in the range of 0.01-0.40 Gauss from the first set.

Further, the third magnetic field sensor $108^3$ may be configured to operate in a third signal strength range having a third minimum signal strength value and a third maximum signal strength value, wherein the third minimum signal strength value is greater than the first minimum signal strength value and the third maximum signal strength value is greater than the first maximum signal strength value. In an exemplary embodiment, the third signal strength range is 0.41 Gauss-1.00 Gauss, wherein the third minimum value is 0.41 Gauss and the third maximum value is 1.00 Gauss. In such cases, the third magnetic field sensor $108^3$ may be configured to identify the magnetic field signals having the signal strength in the range of 0.41 Gauss-1.00 Gauss from the first set. The fourth magnetic field sensors $108^4$ may be configured to operate in a fourth signal strength range having a fourth minimum signal strength value and a fourth maximum signal strength value, wherein the fourth minimum signal strength value is greater than the third minimum signal strength value and the fourth maximum signal strength value is greater than the third maximum signal strength value. In an exemplary embodiment, the fourth signal strength range is 0.60 Gauss-1.5 Gauss, wherein the fourth minimum value is 0.60 Gauss and the fourth maximum value is 1.5 Gauss. In such cases, the fourth magnetic field sensor $108^4$ may be configured to identify the magnetic field signals having the signal strength in the range of 0.60 Gauss-1.5 Gauss from the first set.

The controller 110 is configured to apply a range filter to the magnetic field signals in the first set and accept only magnetic field signals that are in a predetermined signal strength range. To this end, the controller 110 may be configured to determine the signal strength for each magnetic field signal in the first set. The controller 110 may be configured to identify a second set of magnetic field signals having the signal strength range within a predefined signal strength range. The predefined signal strength range may correspond to the signal strength range of the geomagnetic field signals from the Earth i.e., 0.25 Gauss-0.65 Gauss and the one or more magnetic field signals in the second set of magnetic field signals correspond to the geomagnetic signals from the Earth. In some embodiments, the one or more magnetic field signals in the second set of magnetic field signals may include only those magnetic field signals that has stable signal strength and falls within the predefined signal strength range, corresponding to the Earth's geomagnetic signal range. In accordance with the embodiments of the present disclosure, the magnetic field signals with stable signal strength may correspond to any magnetic field signal that does not have any unexpected spikes.

The controller 110 may be configured to first classify the magnetic field signals based on their AoA and signal strength. In accordance with the embodiments of the present disclosure, each set of the magnetic field signal that is classified based on the angle of arrival corresponds to the magnetic field signals from one static magnetic interference source from the plurality of static magnetic interference sources 125, 145 present in the immediate surroundings of the system 100. By classifying the magnetic field signals based on the angle of arrival, the controller 110 may be able to differentiate the magnetic field signals from different static magnetic interference sources 125, 145 present in the immediate surroundings of the system 100.

In some embodiments, for each set of magnetic field signals classified based on the angle of arrival, the controller 110 may be configured to determine whether a minimum signal strength value and a maximum signal strength value of magnetic field signals in the set is detected by the first magnetic field sensor $108^1$. When the minimum signal strength value and the maximum signal strength value of magnetic field signals is detected by the first magnetic field sensor $108^1$, the controller 110 may be configured to determine whether the minimum signal strength value and the maximum signal strength value of magnetic field signals detected by the first magnetic field sensor $108^1$ falls outside the predefined signal strength range, corresponding to the Earth's geomagnetic signal range. In such embodiments, the controller 110 may be configured to discard the magnetic field signals when the minimum signal strength value and the maximum signal strength value of the magnetic field signals detected by first magnetic field sensor $108^1$ falls outside the predefined signal strength range.

In some embodiments, when the minimum signal strength value and the maximum signal strength value of magnetic field signals detected by the first magnetic field sensor $108^1$ lies within the predefined signal strength range and the controller 110 may be configured to select the magnetic field signals for inclusion in the second set of magnetic field signals. In some alternate embodiments, the controller 110 may be configured to discard the magnetic field signals when the minimum signal strength value and the maximum signal strength value of the magnetic field signals detected by first magnetic field sensor $108^1$ does not lie within the predefined signal strength range.

In accordance with the embodiments of the present disclosure, when one of the minimum signal strength value or the maximum signal strength value of a magnetic field signal is not detected by the first magnetic field sensor $108^1$, the controller 110 may be configured to defer the determination of the inclusion or exclusion of the magnetic field signal from the first set of magnetic field signals until both the minimum signal strength value and the maximum signal strength value are determined. In such scenarios, the controller 110 may be configured to look for the same magnetic field signal in the signals obtained by the other magnetic field sensors $108^2$, $108^3$, and $108^4$ and determine the corresponding missing minimum signal strength value or the maximum signal strength value of the same magnetic field signal detected by one or more of the other magnetic field sensors $108^2$, $108^3$, and $108^4$ (as described in detail in the forthcoming disclosure).

In accordance with the embodiments of the present disclosure, when the minimum signal strength value is not detected by the first magnetic field sensor $108^1$ and the maximum signal strength value is detected by the first magnetic field sensor $108^1$, the controller 110 may be configured to determine whether the maximum signal strength value of magnetic field signals detected by the first magnetic field sensor $108^1$ lies within the predefined signal strength range. When the maximum signal strength value of magnetic field signals detected by the first magnetic field sensor $108^1$ lies within the predefined signal strength range, the controller 110 may be configured to determine whether the minimum signal strength value of magnetic field signals, corresponding to the detected angle of arrival, is detected by the second magnetic field sensor $108^2$. The controller 110 may be further configured to determine whether the minimum signal strength value of magnetic field signals detected by the second magnetic field sensor $108^2$ lies within the predefined signal strength range and select the magnetic field signals for inclusion in the second set of magnetic field signals when the minimum signal strength value detected by the second magnetic field sensor $108^2$ and the maximum signal strength value of the magnetic field signals detected by first magnetic field sensor $108^1$ lies within the predefined signal strength range.

In accordance with the embodiments of the present disclosure, when the maximum signal strength value is not detected by the first magnetic field sensor $108^1$ and the minimum signal strength value is detected by the first magnetic field sensor $108^1$, the controller 110 may be configured to determine whether the minimum signal strength value of magnetic field signals detected by the first magnetic field sensor $108^1$ lies within the predefined signal strength range. When the minimum signal strength value of magnetic field signals detected by the first magnetic field sensor $108^1$ lies within the predefined signal range, the controller 110 may be configured to determine whether the maximum signal strength value of magnetic field signals, corresponding to the detected angle of arrival, is detected by the third magnetic field sensor $108^3$. The controller 110 may be further configured to determine whether the maximum signal strength value of magnetic field signals detected by the third magnetic field sensor $108^3$ lies within the predefined signal strength range and select the magnetic field signals for inclusion in the second set of magnetic field signals when the maximum signal strength value detected by the third magnetic field sensor $108^3$ and the minimum signal strength value of the magnetic field signals detected by first magnetic field sensor $108^1$ lies within the predefined signal strength range.

In accordance with some embodiments of the present disclosure, when the maximum signal strength value of magnetic field signals, corresponding to the detected angle of arrival, is not detected by the third magnetic field sensor $108^3$, the controller 110 may be configured to determine whether the maximum signal strength value of magnetic field signals, corresponding to the detected angle of arrival, is detected by the fourth magnetic field sensor $108^4$. The controller 110 may be further configured to determine whether the maximum signal strength value of magnetic field signals detected by the fourth magnetic field sensor $108^4$ lies within the predefined signal strength range. The controller 110 may be further configured to select the magnetic field signals for inclusion in the second set of magnetic field signals when the maximum signal strength value detected by the fourth magnetic field sensor $108^4$ and the minimum signal strength value of the magnetic field signals detected by first magnetic field sensor $108^1$ lies within the predefined signal strength range.

Figure 4:
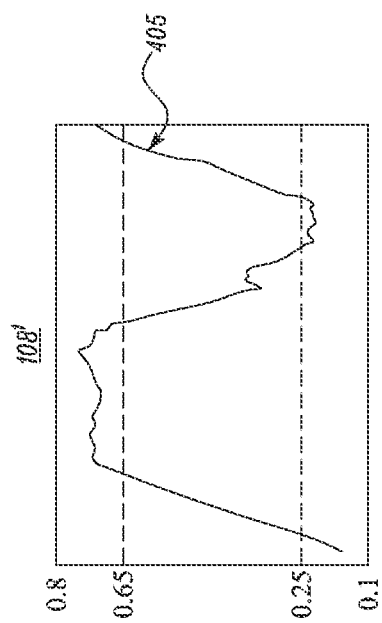
FIG. 4 illustrates a first exemplary signal diagram for determining a set of magnetic field signals corresponding to geomagnetic field of the Earth, in accordance with the embodiments of the present disclosure.

In some embodiments, instead of selecting the magnetic field signals from the first set of magnetic field for inclusion in the second set of magnetic field signals, the controller 110 may be configured to discard the magnetic field signals based on the signal strength range of the magnetic field signal from the first set to obtain the second set of magnetic field signals. In an exemplary embodiment shown in FIG. 4, the controller 110 determines whether the minimum signal strength values and the maximum signal strength values of the magnetic field signal 405 fall outside the predefined signal strength range of 0.25 to 0.65 Gauss. In this exemplary embodiment, since the minimum signal strength value and the maximum signal strength value of the magnetic field signal 405 falls outside the predefined signal strength range of 0.25 to 0.65 Gauss, the controller 110 discards the magnetic field signal 405 and does not include it in the second set of magnetic field signals.

Figure 5:
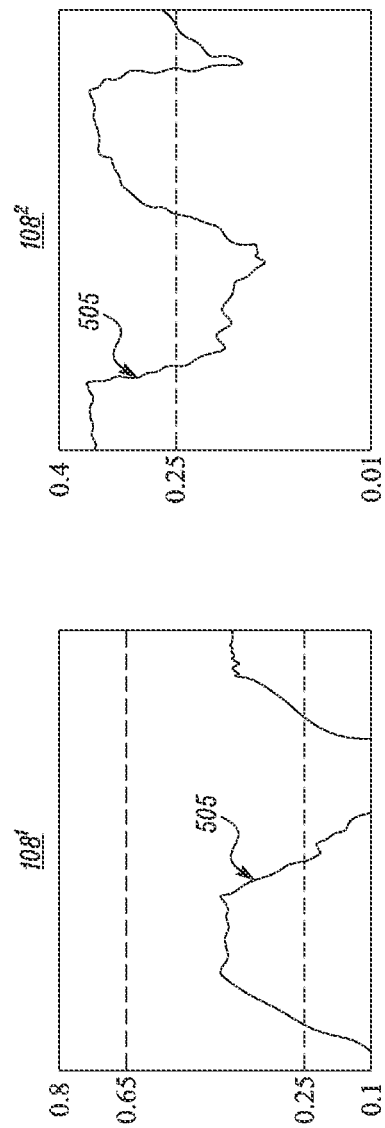
FIG. 5 illustrates a second exemplary signal diagram for determining the set of magnetic field signals corresponding to geomagnetic field of the Earth, in accordance with the embodiments of the present disclosure.

In an exemplary embodiment shown in FIG. 5, the minimum signal strength value of the magnetic field signal 505 cannot be enumerated by the first magnetic field sensor $108^1$ and the maximum signal strength value of the magnetic field signal 505 is enumerated by the first magnetic field sensor $108^1$. In such cases, the controller 110 first determines whether the maximum signal strength value of the magnetic field signal 505 detected by the first magnetic field sensor $108^1$ falls outside the predefined signal strength range. When the maximum signal strength value of magnetic field signal 505 detected by the first magnetic field sensor $108^1$ does not fall outside the predefined signal strength range, the controller 110 may be configured to determine whether the minimum signal strength value of magnetic field signal 505 is detected by the second magnetic field sensor $108^2$. The controller 110 may be further configured to determine whether the minimum signal strength value of magnetic field signal 505 detected by the second magnetic field sensor $108^2$ falls outside the predefined signal strength range and discard the magnetic field signal 505 when the minimum signal strength value detected by the second magnetic field sensor $108^2$ falls outside the predefined signal strength range.

Figure 6:
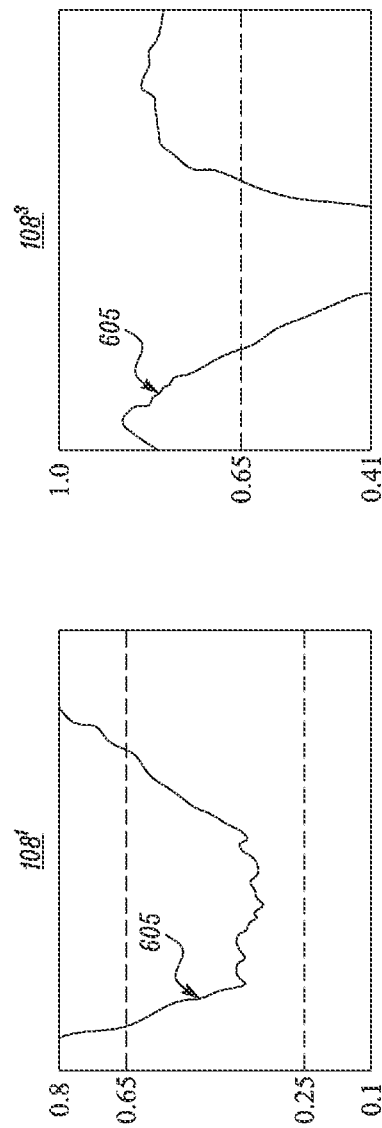
FIG. 6 illustrates a third exemplary signal diagram for determining the set of magnetic field signals corresponding to geomagnetic field of the Earth, in accordance with the embodiments of the present disclosure.

In an exemplary embodiment shown in FIG. 6, the maximum signal strength value of the magnetic field signal 605 is not detected by the first magnetic field sensor $108^1$ and the minimum signal strength value of the magnetic field signal 605 is detected by the first magnetic field sensor $108^1$. In such cases, the controller 110 determines whether the minimum signal strength value of magnetic field signal 605 detected by the first magnetic field sensor $108^1$ falls outside the predefined signal strength range. When the minimum signal strength value of magnetic field signal 605 detected by the first magnetic field sensor $108^1$ does not fall outside the predefined signal range, then the controller 110 determines whether the maximum signal strength value of magnetic field signal 605 is detected by the third magnetic field sensor $108^3$ and if it falls outside the predefined signal strength range. The controller 110 may discard the magnetic field signal 605 if the maximum signal strength value of the magnetic field signal 605 detected by the third magnetic field sensor $108^3$ does not fall within the predefined signal strength range.

Figure 7:
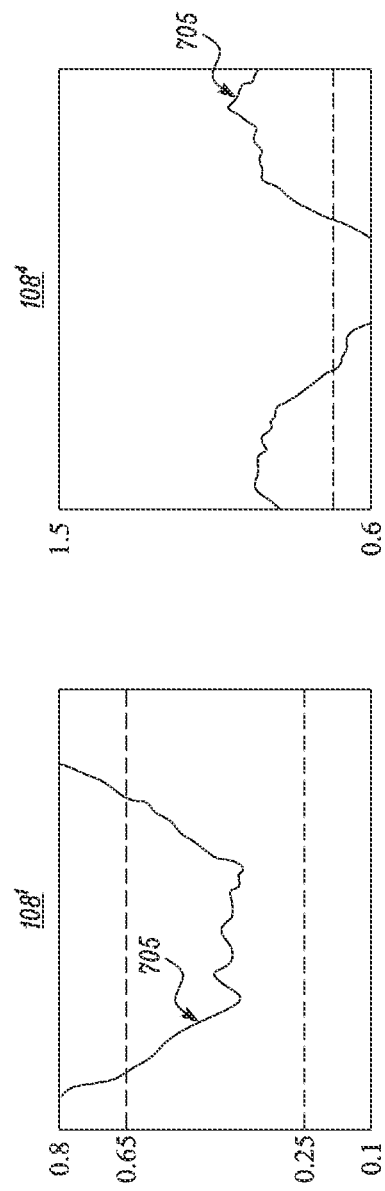
FIG. 7 illustrates a fourth exemplary signal diagram for determining the set of magnetic field signals corresponding to geomagnetic field of the Earth, in accordance with the embodiments of the present disclosure.

In an exemplary embodiment shown in FIG. 7, the maximum signal strength value of magnetic field signal 705 is not detected by the third magnetic field sensor $108^3$. In such case, the controller 110 determines whether the maximum signal strength value of magnetic field signal 705 is detected by the fourth magnetic field sensor $108^4$. The controller 110 then determines whether the maximum signal strength value of magnetic field signal 705 detected by the fourth magnetic field sensor $108^4$ falls outside the predefined signal strength range. The controller 110 may be further configured to discard the magnetic field signal 705 if the maximum signal strength value detected by the fourth magnetic field sensor $108^4$ falls outside the predefined signal strength range.

Advanced Signal Analysis

In some embodiments, the controller 110 may be configured to analyze the one or more magnetic field signals in the second set of magnetic field signals to obtain clean geomagnetic field signals. To do so, the controller 110 may be configured to obtain magnetic field readings taken during a quiet day from the fourth database 138 and compare it with the magnetic field readings (X (northerly intensity), Y (easterly intensity), and Z (vertical intensity, positive downwards), F (total intensity)) of the one or more magnetic field signals in the second set. The controller 110 may be further configured to determine the difference between the magnetic field readings from the quiet day and the magnetic field readings of the one or more magnetic field signals in the second set. When the difference between the readings is greater than a threshold value, the controller 110 may be configured to discard the corresponding magnetic field signals from the second set. In an exemplary embodiment, the threshold value may be predefined by a user or a manufacturer of the system 100. For example, the threshold value may be set to consider fluctuations of more than a certain percentage, for example, 0.1% as noise. In such exemplary embodiments, the magnetic field readings of the one or more magnetic field signals from the second set with fluctuations of more than 0.1% from the magnetic field readings of the quiet day are discarded and are not used for determination of geomagnetic location of the device, such as the device 180.

In order to obtain clean geo-magnetic signals, the controller 110 may be configured to create a floating average data reading of the one or more magnetic field signals in the second set. In an exemplary embodiment, the process of obtaining the average floating value is repeated for a pre-defined number for a pre-defined time duration, for example, up to 100 samples per second for 5 seconds, to obtain the final value of the magnetic field readings. The controller 110 may be further configured to compare the determined average floating value of the magnetic field readings with the magnetic field readings stored in the fifth database 140 and determine the variations between both the readings. The controller 110 may be configured to discard the magnetic field readings with higher variations. In an exemplary embodiment, the controller 110 may be configured to discard the magnetic field readings with variations greater than 0.5%.

This results in the controller 110 obtaining the clean geo-magnetic signals that are free from any noise and interference.

Determination of Geographic Location

The controller 110 may be further configured to plot the obtained clean geomagnetic readings on a map to determine the location of the device 180 or the system 100. To this end, the controller 110 may be configured to utilize the World Magnetic Model (WMM) that represents the total intensity of the magnetic field at various locations on the Earth. In some embodiments, the controller 110 may be configured to determine the total intensity along with the X (northerly intensity), Y (easterly intensity), and Z (vertical intensity, positive downwards) of the magnetic field signal in the second set. The controller 110 may be further configured to identify the location of the system 100 or the device 180 on the WMM based on the obtained clean geo-magnetic readings, using various known techniques.

Display of Geographic Location

The controller 110 may be configured to display the identified geographic location of the system 100 or the device 180 on the I/O unit of the system 100. In some embodiments, the controller 110 may be configured to display the identified geographic location by first displaying the region in which the system 100 or the device 180 and then zooming in to the exact geographic location of the system 100 or the device 180. To this end, the controller 110 may be configured to obtain the magnetic field signals from the plurality of magnetic field sensor probes and directly determine X (northerly intensity), Y (easterly intensity), and Z (vertical intensity, positive downwards) corresponding to the obtained magnetic field signals. The controller 110 is further configured to determine an estimate of the total intensity (F) of each magnetic field signal based on the determined determine X (northerly intensity), Y (easterly intensity), and Z (vertical intensity, positive downwards) without processing the magnetic field signals to remove the magnetic field signals from the plurality of static magnetic interference sources 125, 145, and the plurality of screaming magnetic interference sources 150, 155. The controller 110 may be configured to identify the region in which the system 100 or the device 180 is located by plotting the magnetic field readings such as, X (northerly intensity), Y (easterly intensity), Z (vertical intensity, positive downwards), and F (total intensity or signal strength) using data provided from the WMM. In accordance with various embodiments of the present disclosure, since the region (and not the exact location) of the system 100 or the device 180 is to be determined, the controller 110 may utilize the magnetic field signal readings having some noise/errors (due to the signals from the plurality of static magnetic interference sources 125, 145, and the plurality of screaming magnetic interference sources 150, 155) to determine the region of the system 100 or the device 180.

In some embodiments, the controller 110 may be configured to determine an angular line on a map based on the obtained magnetic field readings from the geomagnetic north. In accordance with various embodiments of the present disclosure, the angular line represents a plurality of geographical locations on the surface of Earth, out of which one of the location corresponds to the location of the device 180 or the system 100. In particular, the angular line limits the possibility of the location of the device 180 or the system 100 from anywhere on the Earth to a single line on the Earth. The controller 110 may be configured to determine the angular line by determining a compass heading based on the obtained X and Y components. The compass heading may be defined as a heading measured clockwise or counterclockwise from the north as indicated by the digital compass 124. To this end, the controller 110 may be configured to determine the compass heading using the following set of equations:

When Y>0, Compass Heading=90−[arcTAN(x/y)]*180/1
When Y<0, Compass Heading=270−[arcTAN(x/y)]*180/1
When Y=0, X<0, Compass Heading=180.0
When Y=0, X>0, Compass Heading=0.0

The controller 110 is then configured to determine an angular value of the angular line based on the determined compass heading. Particularly, the controller 110 may be configured to determine the angular value using the following equation:

Angular value=180−Compass Heading.

The controller 110 may then be configured to obtain the direction of the magnetic north pole from the digital compass 124 and determine the angular line from the magnetic north pole on the map based on the determined angular value. The controller 110 may be further configured to zoom-in to an area intersecting the determined region and the angular line on the WMM before displaying the exact geographic location of the system 100 or the device 180 to the user.

Exemplary Embodiment

Figure 8:
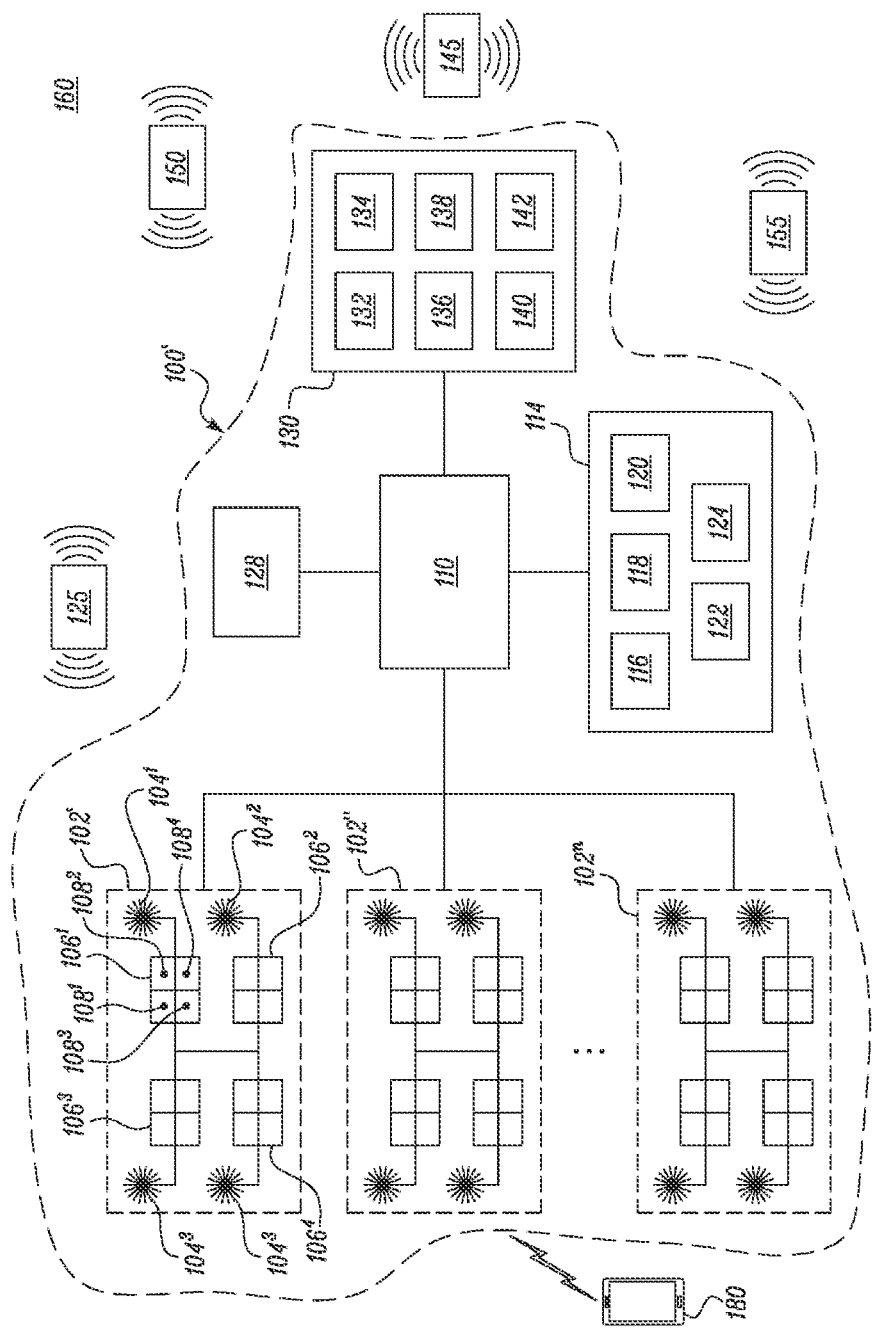
FIG. 8 illustrates an exemplary system for determining a location of a device, in accordance with some alternative embodiments of the present disclosure.

In some embodiments, the system 100 may include a plurality of micro-grids 106 and/or a plurality of antennas 104. In such cases, the plurality of micro-grids 106 and the plurality of antennas 104 may be further arranged in the linear or matrix form of one or more macro-grids. For example, in an exemplary embodiment shown in FIG. 8, the system 100' may include a plurality of macro-grids 102', 102", ... 102$^n$, each containing a plurality of antennas $104^1$, $104^2$, $104^3$, $104^4$ and a plurality of micro-grids $106^1$, $106^2$, $106^3$, $106^4$ of the magnetic field sensors $108^1$, $108^2$, $108^3$, $108^4$ connected to the controller 110 via wired or wireless connections. As shown in FIG. 8, each antenna $104^1$, $104^2$, $104^3$, and $104^4$ is connected to a corresponding one of the plurality of micro-grids $106^1$, $106^2$, $106^3$, and $106^4$. For instance, the antenna $104^1$ is connected to the micro-grid $106^1$, the antenna $104^2$ is connected to the micro-grid $106^2$, and so-on. In some embodiments, although not shown, a plurality of antennas $104^1$, $104^2$, $104^3$, and $104^4$ may be connected to each of the plurality of micro-grids $106^1$, $106^2$, $106^3$, and $106^4$ to perform the following functions, without limiting the scope of the present disclosure. In accordance with various embodiments of the present disclosure, the employment of the plurality of micro-grids $106^1$, $106^2$, $106^3$, $106^4$ of the magnetic field sensors $108^1$, $108^2$, $108^3$, $108^4$, the plurality of macro-grids 102', 102", ... 102$^n$, and the plurality of antennas $104^1$, $104^2$, $104^3$, and $104^4$ in the system 100' increase the number of magnetic field signals detected and processed by the system 100, thereby improving the accuracy of the position determination of the system 100.

Figure 9:
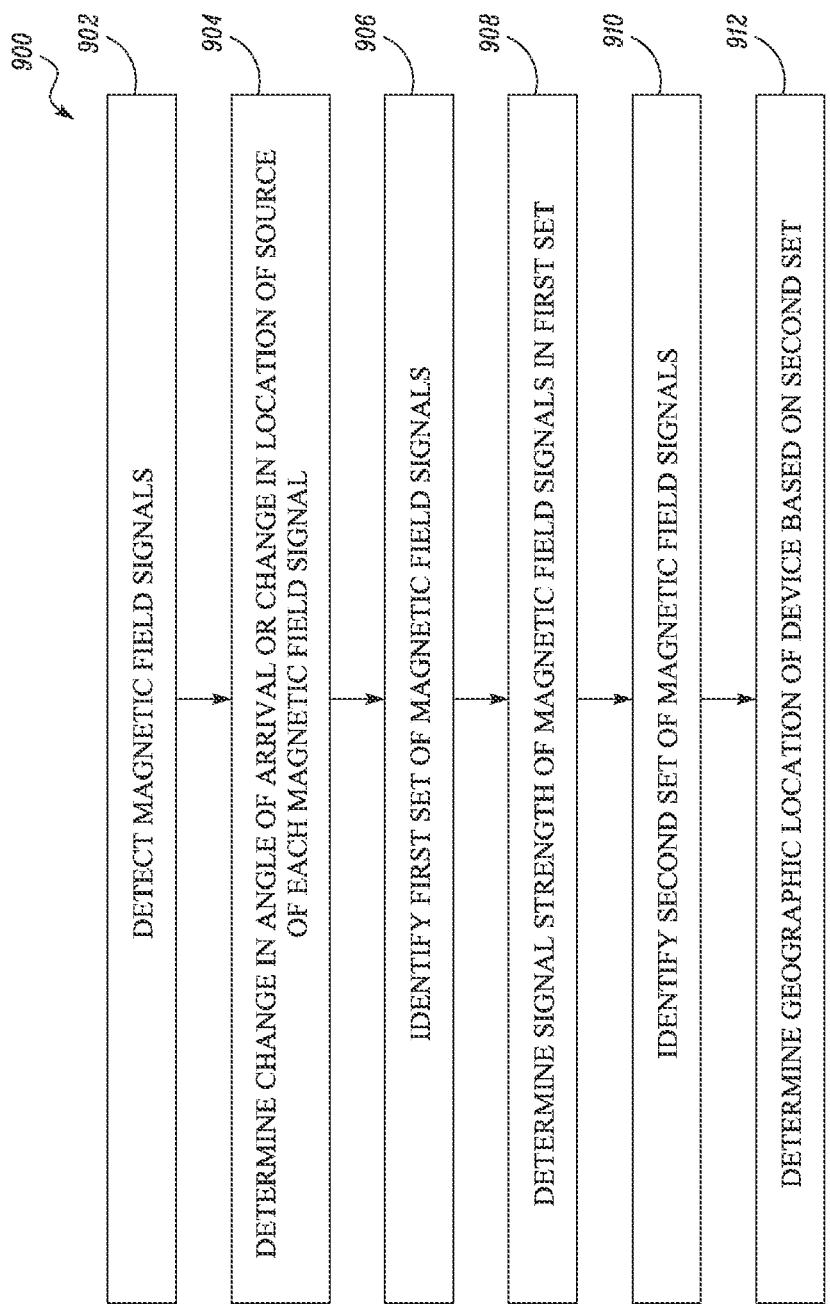
FIG. 9 illustrates a method for determining geographic location of a device, in accordance with the embodiments of the present disclosure.

Method for Determining Geographic Location of Device:

FIG. 9 illustrates an exemplary method 900 for determining the geographic location of the device 180 or the system 100, according to an embodiment of the present disclosure. At step 902, the antenna 104 detects the magnetic field signals in the immediate surroundings of the system 100. The magnetic field signals comprise geomagnetic signal from the Earth and one or more magnetic field signals from one or more of static magnetic interference sources 125, 145 and the screaming magnetic interference sources 150, 155.

At step 904, the controller 110 determines at least one of a change in angle of arrival or a change in location of a source of each magnetic field signal within a predetermined time duration. At step 906, the controller 110 then identifies a first set of magnetic field signals including one or more magnetic field signals having the determined change in the angle of arrival less than or equal to a predetermined angle of arrival threshold value or having the determined change in the location of the source less than or equal to a predetermined location threshold value. The first set of magnetic field signals correspond to the geomagnetic signal and the one or more magnetic field signals received from the static magnetic interference source 125, 145.

At 908, the controller 110 determines the signal strength for each of the one or more magnetic field signals in the first set of magnetic field signals. In accordance with various embodiments, the determining the signal strength for each of the one or more magnetic field signals in the first set of magnetic field signals comprises determining the signal strength using at least one micro-grid 106. The controller 110 further identifies a second set of magnetic field signals including one or more magnetic field signals having the signal strength range within a predefined signal strength range at step 910. In accordance with various embodiments, identifying the second set of magnetic field signals further comprises identifying the second set of magnetic field signals using the at least one micro-grid 106, the at least one microgrid including a plurality of magnetic field sensors $108^1, 108^2, 108^3, 108^4$ coupled to the controller 110, each of the magnetic field sensor $108^1, 108^2, 108^3, 108^4$ operating in different signal strength ranges and configured to obtain magnetic field signals in the respective signal strength range from the controller 110. The predefined first signal strength range corresponds to the signal strength range of the geomagnetic signals from the Earth. The controller 110, at step 912, further determines the geographic location of the device 180 based on the identified second set of magnetic field signals.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

It may be contemplated that the database described herein may be internal and/or external database and may include data repositories, or other data sources. Although, there is a single database described in the present disclosure, it may be contemplated by a person ordinarily skilled in the art that multiple databases can be used, without deviating from the scope of the present disclosure. In some embodiments, the databases may be implemented using a relational database, such as Sybase, Oracle, CodeBase and Microsoft® SQL Server as well as other types of databases such as, for example, a flat file database, an entity-relationship database, and object-oriented database, a record-based database, or the like.

The claims can encompass embodiments for hardware, software, or a combination thereof. It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

While aspects of the present disclosure have been particularly shown, and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A system comprising:
   at least one antenna configured to detect magnetic field signals, wherein the magnetic field signals comprise geomagnetic signal from the Earth and one or more magnetic field signals from one or more of static magnetic interference source and screaming magnetic interference source; and
   a controller coupled to the at least one antenna, the controller being configured to:
   determine, for each magnetic field signal, at least one of a change in angle of arrival or a change in location of a source of the magnetic field signal within a predetermined time duration;
   identify a first set of magnetic field signals including one or more magnetic field signals having the determined change in the angle of arrival less than or equal to a predetermined angle of arrival threshold value or having the determined change in the location of the source less than or equal to a predetermined location threshold value, wherein the first set of magnetic field signals corresponds to the geomagnetic signal and the one or more magnetic field signals received from the static magnetic interference source;
   determine the signal strength for each of the one or more magnetic field signals in the first set of magnetic field signals;
   identify a second set of magnetic field signals including one or more magnetic field signals having the signal strength range within a predefined signal strength range, wherein the predefined first signal strength range corresponds to the signal strength range of the geomagnetic signals from the Earth; and
   determine a geographic location of a device based on the identified second set of magnetic field signals.

2. The system as claimed in claim 1, wherein the at least one antenna is a multiple input multiple output antenna.

3. The system as claimed in claim 2, wherein the multiple input multiple output antenna includes a plurality of magnetic field sensor probes, wherein each magnetic field sensor probe includes an in-built antenna element and a magnetic field sensor coupled to the antenna element to detect the magnetic field signals.

4. The system as claimed in claim 3, wherein each of the plurality of magnetic field sensor probes are positioned at a different angle with respect to the remaining plurality of magnetic field sensor probes on the at least one multiple input multiple output antenna.

5. The system as claimed in claim 3, wherein the controller is configured to determine the geographic location of the device based on the magnetic field signals received from two or more of the plurality of magnetic field sensor probes.

6. The system as claimed in claim 3, wherein the controller is further configured to:
   identify a primary magnetic field sensor probe from the plurality of magnetic field sensor probes on the multiple input multiple output antenna, and
   determine the geographic location of the device based on the magnetic field signals received from the primary magnetic field sensor probe.

7. The system as claimed in claim 6, wherein the primary magnetic field sensor probe is the magnetic field sensor probe that is aligned in the direction of the movement of the system.

8. The system as claimed in claim 6, wherein the primary magnetic field sensor probe is the magnetic field sensor probe that is aligned with an angular placement of the plane of the system.

9. The system as claimed in claim 1, further comprising:
at least one microgrid including a plurality of magnetic field sensors coupled to the controller, each of the magnetic field sensor operating in different signal strength ranges and being configured to obtain magnetic field signals in the respective signal strength range from the controller,
wherein the controller is configured to determine the signal strength for each of the one or more magnetic field signals in the first set of magnetic field signals and identify the second set of magnetic field signals using the at least one microgrid.

10. The system as claimed in claim 9, wherein the microgrid includes at least four magnetic field sensors.

11. The system as claimed in claim 9, wherein the microgrid includes:
(i) a first magnetic field sensor operating in a first signal strength range having a first minimum signal strength value and a first maximum signal strength value;
(ii) a second magnetic field sensor operating in a second signal strength range having a second minimum signal strength value and a second maximum signal strength value, wherein the second minimum signal strength value is less than the first minimum signal strength value and the second maximum signal strength value is less than the first maximum signal strength value;
(iii) a third magnetic field sensor operating in a third signal strength range having a third minimum signal strength value and a third maximum signal strength value, wherein the third minimum signal strength value is greater than the first minimum signal strength value and the third maximum signal strength value is greater than the first maximum signal strength value; and
(iv) a fourth magnetic field sensor operating in a fourth signal strength range having a fourth minimum signal strength value and a fourth maximum signal strength value, wherein the fourth minimum signal strength value is greater than the third minimum signal strength value and the fourth maximum signal strength value is greater than the third maximum signal strength value.

12. The system as claimed in claim 11, wherein the controller is configured to identify the second set of magnetic field signals having the signal strength range within the predefined signal strength range by:
classifying the one or more magnetic field signals in the first set of magnetic field signals based on the angle of arrival of the one or more magnetic field signals;
for each detected angle of arrival:
determining, whether a minimum signal strength value and a maximum signal strength value of magnetic field signals, corresponding to the detected angle of arrival, is detected by the first magnetic field sensor;
when the minimum signal strength value and the maximum signal strength value of magnetic field signals is detected by the first magnetic field sensor:
determine whether the minimum signal strength value and the maximum signal strength value of magnetic field signals detected by the first magnetic field sensor lies within the predefined signal strength range; and
select the magnetic field signals for inclusion in the second set of magnetic field signals when the minimum signal strength value and the maximum signal strength value of the magnetic field signals detected by first magnetic field sensor lies within the predefined signal strength range.

13. The system as claimed in claim 12, wherein when the minimum signal strength value is not detected by the first magnetic field sensor and the maximum signal strength value is detected by the first magnetic field sensor, the controller is configured to:
determine whether the maximum signal strength value of magnetic field signals detected by the first magnetic field sensor lies within the predefined signal strength range;
upon determining that the maximum signal strength value of magnetic field signals detected by the first magnetic field sensor lies within the predefined signal strength range, determine whether the minimum signal strength value of magnetic field signals, corresponding to the detected angle of arrival, is detected by the second magnetic field sensor;
determine whether the minimum signal strength value of magnetic field signals detected by the second magnetic field sensor lies within the predefined signal strength range when the minimum signal strength value of magnetic field signals is detected by the second magnetic field sensor; and
select the magnetic field signals for inclusion in the second set of magnetic field signals when the minimum signal strength value detected by the second magnetic field sensor and the maximum signal strength value of the magnetic field signals detected by first magnetic field sensor lies within the predefined signal strength range.

14. The system as claimed in claim 12, wherein when the maximum signal strength value is not detected by the first magnetic field sensor and the minimum signal strength value is detected by the first magnetic field sensor, the controller is configured to:
determine whether the minimum signal strength value of magnetic field signals detected by the first magnetic field sensor lies within the predefined signal strength range;
upon determining that the minimum signal strength value of magnetic field signals detected by the first magnetic field sensor lies within the predefined signal range, determine whether the maximum signal strength value of magnetic field signals, corresponding to the detected angle of arrival, is detected by the third magnetic field sensor;
determine whether the maximum signal strength value of magnetic field signals detected by the third magnetic field sensor lies within the predefined signal strength range when the maximum signal strength value of magnetic field signals is detected by the third magnetic field sensor; and
select the magnetic field signals for inclusion in the second set of magnetic field signals when the maximum signal strength value detected by the third magnetic field sensor and the minimum signal strength value of the magnetic field signals detected by first magnetic field sensor lies within the predefined signal strength range.

15. The system as claimed in claim 14, wherein when the maximum signal strength value of magnetic field signals, corresponding to the detected angle of arrival, is not detected by the third magnetic field sensor, the controller is configured to:
- determine whether the maximum signal strength value of magnetic field signals, corresponding to the detected angle of arrival, is detected by the fourth magnetic field sensor;
- determine whether the maximum signal strength value of magnetic field signals detected by the fourth magnetic field sensor lies within the predefined signal strength range when the maximum signal strength value of magnetic field signals is detected by the fourth magnetic field sensor; and
- select the magnetic field signals for inclusion in the second set of magnetic field signals when the maximum signal strength value detected by the fourth magnetic field sensor and the minimum signal strength value of the magnetic field signals detected by first magnetic field sensor lies within the predefined signal strength range.

16. A method for determining a geographic location of a device, the method comprising:
- detecting, by at least one antenna, magnetic field signals, wherein the magnetic field signals comprise geomagnetic signal from the Earth and one or more magnetic field signals from one or more of static magnetic interference source and screaming magnetic interference source;
- determining, by a controller, at least one of a change in angle of arrival or a change in location of a source of each magnetic field signal within a predetermined time duration;
- identifying, by the controller, a first set of magnetic field signals including one or more magnetic field signals having the determined change in the angle of arrival less than or equal to a predetermined angle of arrival threshold value or having the determined change in the location of the source less than or equal to a predetermined location threshold value, wherein the first set of magnetic field signals correspond to the geomagnetic signal and the one or more magnetic field signals received from the static magnetic interference source;
- determining, by the controller, the signal strength for each of the one or more magnetic field signals in the first set of magnetic field signals;
- identifying, by the controller, a second set of magnetic field signals including one or more magnetic field signals having the signal strength range within a predefined signal strength range, wherein the predefined first signal strength range corresponds to the signal strength range of the geomagnetic signals from the Earth; and
- determining, by the controller, a geographic location of a device based on the identified second set of magnetic field signals.

17. The method as claimed in claim 16, wherein the at least one antenna is a multiple input multiple output antenna including a plurality of magnetic field sensor probes.

18. The method as claimed in claim 17, further comprising:
- identifying a primary magnetic field sensor probe from the plurality of magnetic field sensor probes on the multiple input multiple output antenna, and
- determining the geographic location of the device based on the magnetic field signals received from the primary magnetic field sensor probe.

19. The method as claimed in claim 18, wherein the primary magnetic field sensor probe is the magnetic field sensor probe that is aligned in the direction of the movement of the system when the system is in motion or the magnetic field sensor probe that is aligned with an angular placement of the plane of the system when the system is stationary.

20. The method as claimed in claim 16, wherein determining the signal strength for each of the one or more magnetic field signals in the first set of magnetic field signals comprises determining the signal strength using at least one microgrid and further wherein identifying the second set of magnetic field signals further comprises identifying the second set of magnetic field signals using the at least one microgrid, the at least one microgrid including a plurality of magnetic field sensors coupled to the controller, each of the magnetic field sensor operating in different signal strength ranges and configured to obtain magnetic field signals in the respective signal strength range from the controller.

* * * * *